United States Patent
Imamura (10) Patent No.: US 7,652,797 B2
(45) Date of Patent: Jan. 26, 2010

(54) IMAGE PROCESSOR

(75) Inventor: Keiichi Imamura, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 842 days.

(21) Appl. No.: 11/304,975

(22) Filed: Dec. 14, 2005

(65) Prior Publication Data

US 2006/0132637 A1 Jun. 22, 2006

(30) Foreign Application Priority Data

Dec. 17, 2004 (JP) ............................. 2004-365207

(51) Int. Cl.
 H04N 1/21 (2006.01)
 H04N 5/91 (2006.01)
(52) U.S. Cl. ....................... 358/296; 386/83
(58) Field of Classification Search ................ 358/296, 358/1.15, 1.14, 1.16, 1.18; 725/38, 58, 104; 348/331.01, E5.067; 386/83, 124, 126, E5.001; 382/100, 107, 284, 298, 294; 713/150, 161, 713/190, 340
See application file for complete search history.

(56) References Cited

U.S. PATENT DOCUMENTS

| 6,295,086 B1 | 9/2001 | Fukushima et al. |
| 6,519,000 B1 | 2/2003 | Udagawa |
| 2004/0054963 A1 * | 3/2004 | Kobayashi et al. .......... 715/500 |
| 2004/0187078 A1 | 9/2004 | Girgensohn |

FOREIGN PATENT DOCUMENTS

| EP | 0 805 405 A2 | 11/1997 |
| JP | 9-130591 A | 5/1997 |
| JP | 10-277195 A | 10/1998 |
| JP | 10-334264 A | 12/1998 |
| JP | 2004-15585 A | 1/2004 |
| JP | 2004-214897 A | 7/2004 |
| TW | 521193 | 2/2003 |

OTHER PUBLICATIONS

Japanese Office Action dated Dec. 16, 2008 and English translation thereof issued in counterpart Japanese Application No. 2004-365207.

(Continued)

*Primary Examiner*—Saeid Ebrahimi Dehkordy
(74) *Attorney, Agent, or Firm*—Frishauf, Holtz, Goodman & Chick, P.C.

(57) ABSTRACT

From a moving image selected by a user, moving image information including a time length of the moving image and the number of change points of clips in the moving image is acquired. Layout data showing a design (the number, size, layout and the like of plural frame images configuring moving image) of a still image to be generated is selectively read from a memory based on the acquired moving image information. A still image in which predetermined frame images are arranged based on the layout data is generated and output. The predetermined frame images are automatically set in accordance with setting rules that are different depending on whether or not there is data concerning a highlight frame whose size is larger than that of other frame images in the layout data. The highlight frame may be also designated.

9 Claims, 10 Drawing Sheets

OTHER PUBLICATIONS

A Taiwanese Office Action (and English translation thereof) dated Jan. 17, 2008, issued in a counterpart Taiwanese Application.

A. Girgensohn: "A Fast Layout Algorithm For Visual Video Summaries", Multimedia and Expo, 2003. Proceedings. 2003 International Conference on Jul. 6-9, 2003, Piscataway, NJ, USA, IEEE, vol. 2, Jul. 6, 2003, pp. 77-80, XP010650748 ISBN: 0-7803-7965-9.

J. Foote et al: "Enhanced Video Browsing Using Automatically Extracted Audio Excerpts", Multimedia and Expo, 2002. ICME '02. Proceedings. 2002 International Conference on Lausanne, Switzerland Aug. 26-29, 2002, Piscataway, NJ, USA, IEEE, US vol. 2, Aug. 26, 2002, pp. 357-360, XP010604771, ISBN: 0-7803-7304-9.

D. M. Russell et al: "Synthesizing Evocative Imagery Through Design Patterns", System Sciences 2003, Proceedings of the 36th Annual Hawaii International Conference on Jan. 6-9, 2003, Piscataway, NJ, USA,, IEEE, Jan. 6, 2003, pp. 101-104, XP01626384 ISBN: 0-7695-1874-5.

M. Gelcon et al:"Determining A Structured Spatio-Temporal Representation Of Video Content For Efficient Visualization And Indexing", European Conference on Computer Vision, Berlin, Germany, vol. 1, 1998, pp. 595-609, XP002334254.

H. Ueda et al Association for Computing Machinery: "Automatic Structure Visualization For Video Editing", Bridges Between Worlds, Amsterdam, Apr. 24-29, 1993, Proeedings of the Conference on Human Factors in Computing Systems, (INTERCHI), Reading, Addision Wesley, USA, Apr. 24, 1993, p. 137-141, figures 3-5, XP000195707.

Yong Rui et al: "Efficient Accecss to Video Content In A Unified Framework", Multimedia Computing and Systems, 1999. IEEE International Conference on Florence, Italy Jun. 7-11, 1999. Los Alamitos, CA, USA, IEEE Comput. Soc., US, vol. 2, Jun. 7, 1999, pp. 735-740, XP010519479, ISBN 0-7695-0253-9.

Patent Abstracts of Japan, vol. 2000, No. 21, Aug. 3, 2001 and JP 2001-111877 A (Hitachi Ltd.), Apr. 20, 2001—entire document.

Patent Abstracts of Japan, vol. 2000, No. 04, Aug. 31, 2000 and JP 2000-023081 A (Sanyo Electric Co., Ltd.), Jan. 21, 2000—entire document.

* cited by examiner

IMAGE PROCESSOR

CROSS-REFERENCE TO RELATED APPLICATIONS

This application is based upon and claims the benefit of priority from prior Japanese Patent Application No. 2004-365207, filed Dec. 17, 2004, the entire contents of which are incorporated herein by reference.

BACKGROUND OF THE INVENTION

1. Field of the Invention

The present invention relates to an image processor for producing a still image from a moving image, and more specifically, to an image processor, an image processing method, and a digital camera that lay out frame images extracted from the moving image on a frame of still image and output the still image.

2. Description of the Related Art

Conventionally, as a device for making a moving image into a still image, for example, Jpn. Pat. Appln. KOKAI Publication No. 09-130591 discloses a printer device. The printer device automatically selects key frames as frame data configuring a singly completed still image from compressed moving image data, thereby creating still image data wherein the frame images thereof are arranged in a predetermined layout, and further automatically selects frame data at predetermined time intervals from non-compressed moving image data, thereby creating still image data wherein the frame images thereof are arranged in a predetermined layout.

According to the printer device described above, it is possible to easily obtain a still image corresponding to a moving image, but automatically selected frame images are not always images that appropriately show the entire characteristics of the moving image. Further, even if automatically selected frame images are appropriate as to show the entire characteristics of the moving image, the layout format thereof (number of frames arranged and layout positions) is not always appropriate as to show the entire characteristics of the moving image, which has been a problem in the prior art.

BRIEF SUMMARY OF THE INVENTION

According to an embodiment of the invention, an image processor comprises:

a memory which stores a moving image;

a layout information storage which stores plural items of layout information showing plural layout formats of plural frame images included in the moving image;

an acquiring unit which acquires moving image information peculiar to the moving image from the moving image stored in the memory;

a selector which selects one of the layout information stored in the layout information storage based on the moving image information acquired by the acquiring unit; and a still image generating unit which generates a still image in which frame images included in the moving image stored in the memory are arranged in a layout format shown by the layout information selected by the selector.

According to another embodiment of the invention, an image processing method comprises:

acquiring moving image information peculiar to a moving image;

selecting one of layout information based on the acquired moving image information; and generating a still image in which frame images included in the moving image are arranged in a layout format shown by the selected layout information.

According to another embodiment of the invention, an article of manufacture comprising a computer usable medium having computer readable program code means embodied therein, the computer readable program code means comprises:

computer readable program code means for causing a computer to acquire moving image information peculiar to a moving image;

computer readable program code means for causing a computer to select one of layout information based on the acquired moving image information; and computer readable program code means for causing a computer to generate a still image in which frame images included in the moving image are arranged in a layout format shown by the selected layout information.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

First Embodiment

Figure 1:
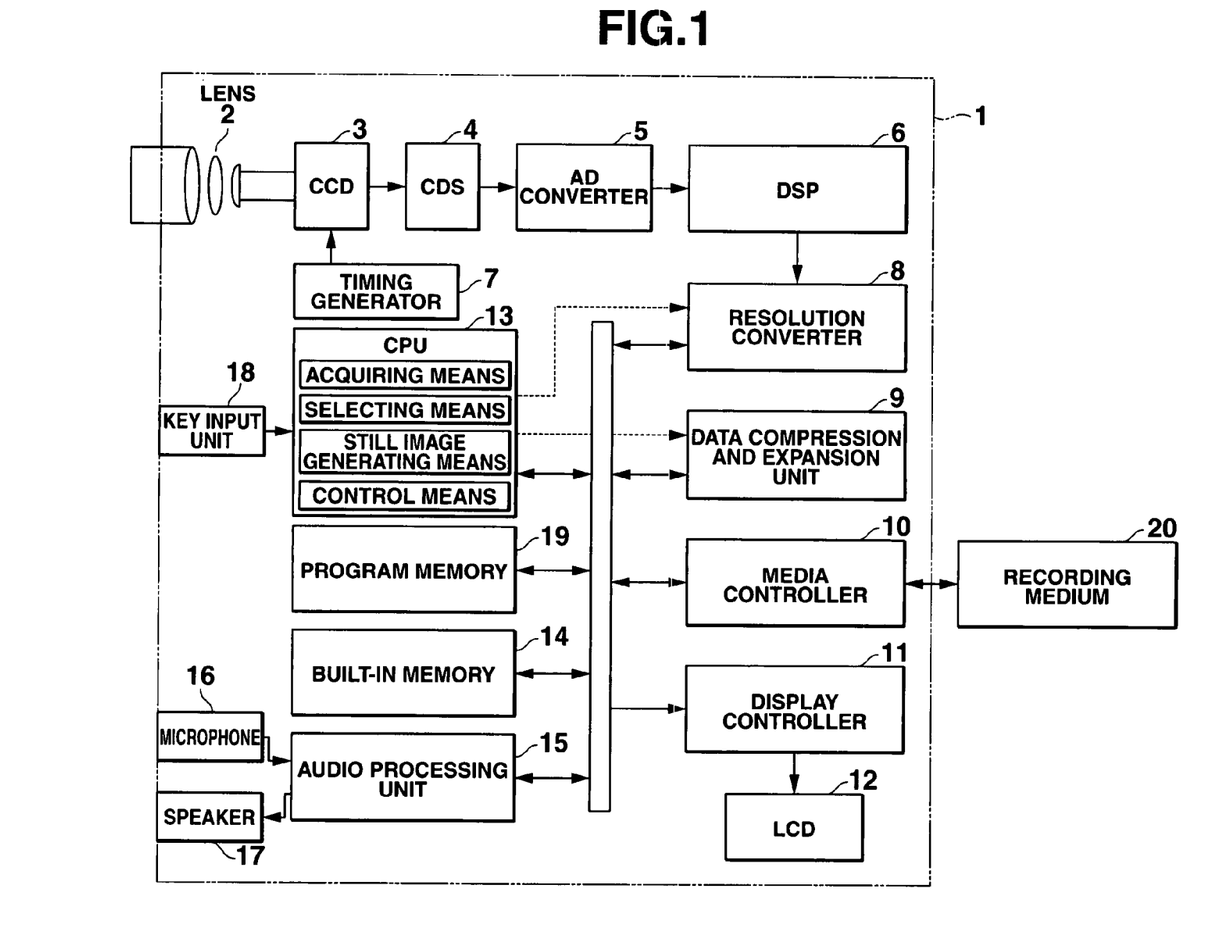
FIG. 1 is a block diagram showing a digital camera according to embodiments of the present invention.

FIG. 1 is a block diagram showing a digital camera common to embodiments according to the present invention. The digital camera has a still image recording mode and a moving image recording mode as a recording mode. The digital camera further has a still image generation mode for generating a still image from a moving image (making a moving image into a still image) and recording the still image, as a mode of a subordinate of a reproduction mode for displaying a recorded image by recording (a still image or moving image), and has the following configuration.

Specifically, the digital camera includes a camera main body 1, and a recording medium, such as a semiconductor memory card 20 that is detachable to and attachable from the camera main body 1. An optical system 2 including a zoom lens and a focus lens and a CCD 3 are disposed in the camera main body 1. The CCD 3 operates as imaging means, and is driven by driving signals transmitted from a timing generator 7, and photoelectrically converts an optical image of an object to an output imaging signal thereof. The output signal from the CCD 3 is subjected to correlation double sampling and gain adjustment in a CDS (Correlation Double Sampling) circuit 4, and then converted into a digital signal by an A/D converting circuit 5. The A/D-converted imaging signal is input to a DSP (Digital Signal Processing) unit 6, where processes including pedestal clamping are performed on the input signal, and then converted into a brightness (Y) signal and a color difference (UV) signal by a brightness/color difference matrix circuit in the unit. In the DSP unit 6, processes for improving image quality such as auto iris, auto white balance, and edge enhancement are also performed.

YUV data converted by the DSP unit 6 is converted into a preset image size by a resolution converting block 8, and then, data for one frame is sequentially stored in a built-in memory 14 (for example, SDRAM). The YUV data for one frame stored in the built-in memory 14 is transmitted to a display controller 11, and converted into a video signal therein. Thereafter, the converted signal is displayed as a through image, i.e., a moving image by a liquid crystal display (LCD) 12. The DSP unit 6 and the resolution converting block 8 operate as image generating means, and the LCD 12 operates as moving image display means.

The YUV data for one frame stored in the built-in memory 14 at recording in the still image mode is compressed into a JPEG format or the like by means of a data compressing and expanding block 9, and then coded, and made into a file in the built-in memory 14. Thereafter, the data is recorded as still image data (a still image file) via a media controller 10 to a recording medium 20 operating as recording and saving means.

The YUV data stored in the built-in memory 14 at recording in the moving image mode is transmitted to the data compressing and expanding block 9, and compressed by a codec of a predetermined moving image recording format (for example, Motion-JPEG or MPEG) and then coded. Finally, the data is recorded as a moving image file in the recording medium 20 via the media controller 10. The frame rate in recording a moving image is determined by a timing signal created by the timing generator 7, and the compression rate of data to be coded is determined by a quantization table value in the data compressing and expanding block 9.

The data compressing and expanding block 9 expands data of a still image or a moving image read from the recording medium 20 at the moment of reproducing the still image or the moving image, and develops the data in the built-in memory 14 as still image data and frame data of a moving image. The developed image is transmitted to the display controller 11, and converted into a video signal therein, and then displayed as a reproduction image by the LCD 12. On the LCD 12, not only the through image and the reproduction image, but also a menu screen and a setting screen for selecting and setting various functions in the digital camera as necessary are displayed.

An audio processing block 15 converts audio input to a microphone 16 built in the camera main body 1 at the moment of recording a moving image into a digital signal, compresses the digital signal, and then transmit the compressed signal as audio data to the built-in memory 14. The audio data transmitted to the built-in memory 14 together with frame data is sequentially written as stream data into the recording medium 20. At the moment of reproducing the moving image, the audio processing block 15 decodes the audio data transmitted from the built-in memory 14, converts the audio data into an analog audio signal, and then outputs the data as audio from a built-in speaker 17 built in the camera main body 1.

A key input block 18 includes operation keys such as a power key, a mode switching key, a shutter key, a menu key, and a set key, and outputs a key input signal corresponding to a user's key operation to the CPU 13. The shutter key is used to instruct recording in the still image mode, is used to instruct start/end of recording in the normal moving image mode, and is also used to instruct recording and saving in the past movie mode.

Each of the above blocks is controlled by the CPU 13, and programs and data necessary for the CPU 13 to control the respective blocks are stored in a program memory 19 as a programmable nonvolatile memory such as an EEPROM or a flash memory. The CPU 13 includes functions of acquiring means, selecting means, still image generation means, and control means by performing its operations based on the above programs and key input signals. Setting data concerning the system and respective functions set by the user are also stored in the program memory 19.

Figure 2A:
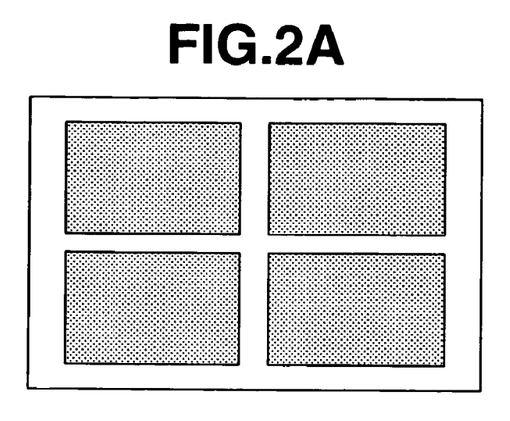
FIGS. 2A, 2B and 2C are views showing design examples of a still image.
Figure 2B:
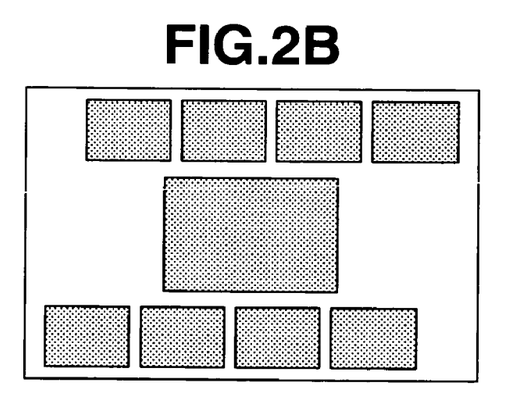
Figure 2C:
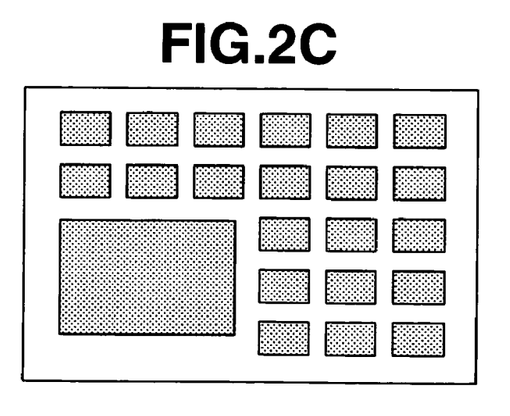

The program memory 19 operates as layout information storage means, and layout data for use in the operation in the still image generation mode is stored in the program memory 19. The layout data is data that shows a design of a still image to be generated in making a moving image into a still image, namely, the number, size, layout and the like of plural frame images (frames) that configure the moving image. FIGS. 2A to 2C are views showing an example of the above design.

Figure 3:
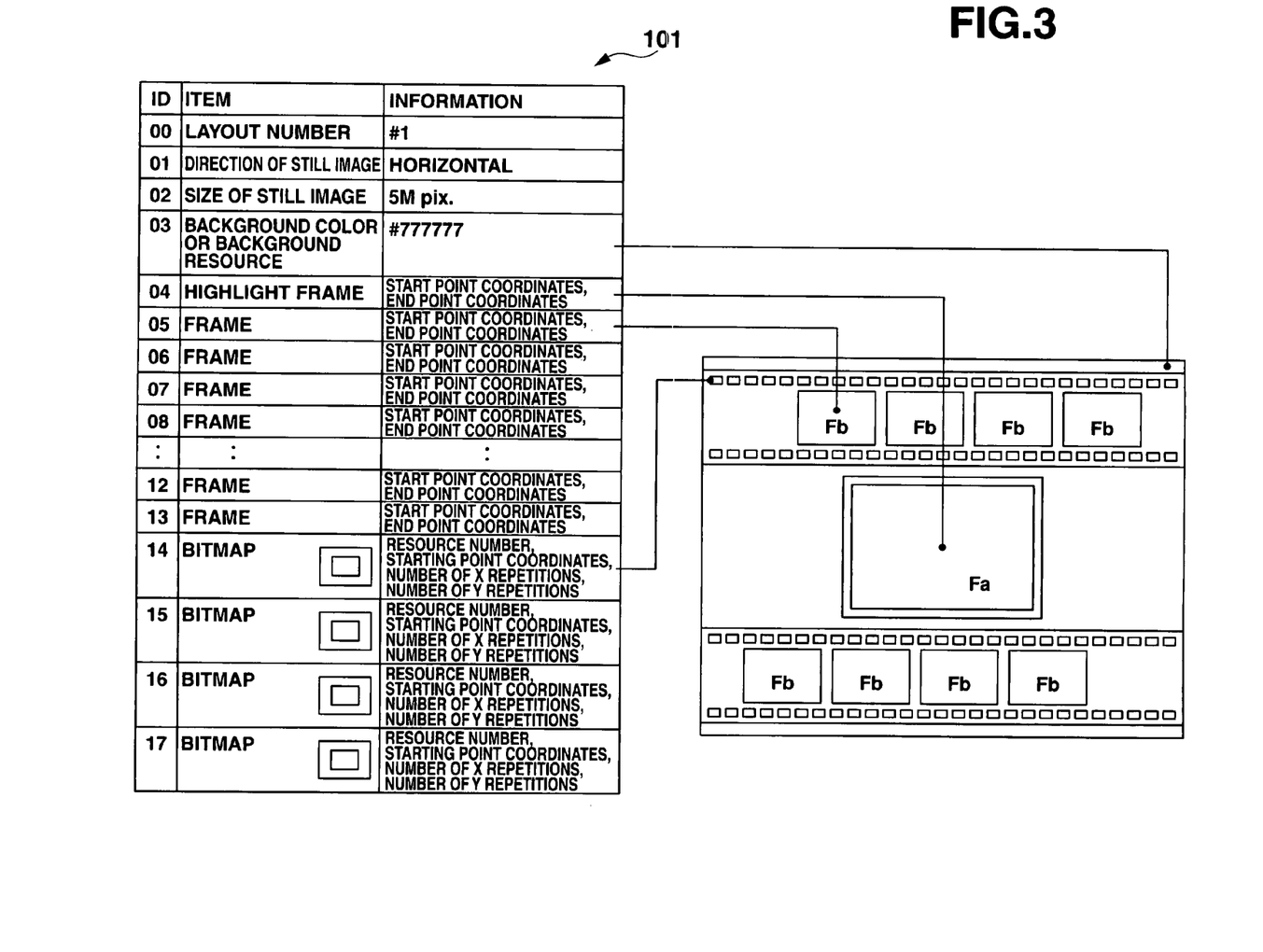
FIG. 3 is an explanatory view showing an example of a concrete data configuration of layout data.

FIG. 3 is an explanatory view showing a concrete data configuration of layout data 101 corresponding to the design shown in FIG. 2B. As shown in the figure, the layout data 101 comprises plural items of setting information determined every plural items of data ID00 to ID17. In the illustrated data items, ID00 "layout number" is an identification number showing a design type. ID04 "highlight frame" and ID05 to ID13 "frame" are layout areas (position and size) of a frame image in a still image. The "highlight frame" is data showing a layout area Fa of an image of a highlight frame as a representative frame of the present invention whose size is larger than that of other frames, and the "frame" is data showing layout areas Fb of images in other frames (referred to as ordinary frame against representative frame). Meanwhile, in some design types, there may be no "highlight frame", and the number of items of "frame" data increases and decreases according to design types. Further, ID14 to ID17 "bitmap" is data showing a decorative image, and a layout thereof.

Figure 4:
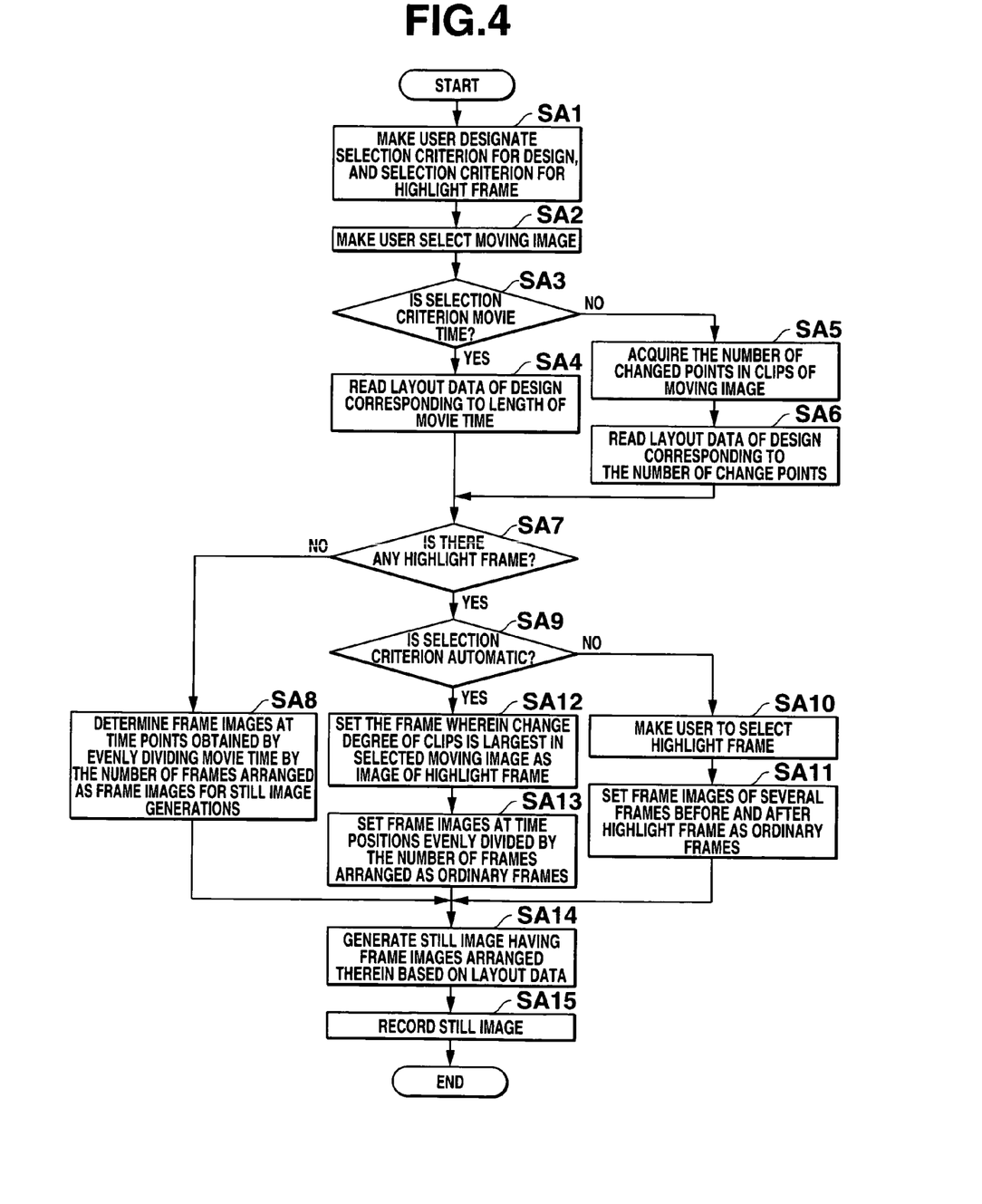
FIG. 4 is a flow chart showing the contents of a still image generation process in a first embodiment.

Next, the operation when the still image generation mode is set in the digital camera having the above configuration will be explained. FIG. 4 is a flow chart showing the contents of the still image generation process executed by the CPU 13.

When the still image generation process is started, the CPU 13 causes the LCD 12 to display a predetermined designation screen, and allows the user to designate the selection criterion for the design of a still image to be generated, and the selection criterion for the highlight frame (step SA1). The selection criterion for the design includes two types, "movie time" and "moving image contents", and the selection criterion for the highlight frame includes two types, "manual" and "auto". Designated selection criteria are stored into the program memory 19 together with other setting information in the digital camera.

The CPU 13 causes the LCD 12 to display, for example, a list of thumbnails of first frames of the moving image stored in the recording medium 20, and allows the user to select desired moving image through predetermined key operations (step SA2). When the selection criterion is "movie time" (YES in step SA3), the layout data 101 of a design corresponding to a time length of the selected moving image is read out from the program memory 19 (step SA4). Namely, as the movie time is longer, the layout data 101 of a design with more frame images arranged therein is read out.

When the selection criterion is "moving image contents" (NO in step SA3), the CPU 13 acquires the number of changed points in clips of the selected moving image, for example, the number of portions where changes in clips are not less than the predetermined criterion, like a portion where a time period in which audio is interrupted is a predetermined time period or more, or a portion where the change degree of color tone is a predetermined degree or more (step SA5). Then, the layout data 101 of a design corresponding to the acquired number of change points is read out from the program memory 19 (step SA6). Namely, as the number of change points is larger, the layout data 101 of a design with more frame images arranged therein is read out.

It is determined in step SA7 whether or not the layout data 101 read out in step SA4 or step SA6 includes information of a highlight frame, namely whether or not the automatically selected design includes a highlight frame. If there is no highlight frame (NO in step SA7), plural frame images at time points obtained by evenly dividing the time length of the moving image selected by the user by the number of frame images arranged in the automatically selected design are determined as frame images for still image generation (step SA8). A still image wherein the determined plural frame images are arranged according to the layout data 101 is generated (step SA14), and the generated still image (still image file) is recorded into the recording medium 20 (step SA15).

If the determination result in step SA7 is YES, and there is a highlight frame in the automatically selected design and the selection criterion for the aforementioned highlight frame is "manual" (NO in step SA9), the user is prompted to select a highlight frame (step SA10). More specifically, a message to prompt the user to select a highlight frame, and a selection screen 110 (refer to FIG. 5A) that displays the selected moving image in a single frame forward step or a single frame backward step in accordance with the user's key operations are displayed on the LCD 12, and an arbitrary frame image displayed at the time point when the user performs the key operation for determination is determined as a highlight frame. Several frames before and after the determined highlight frame, namely, the frame images for the frames corresponding to the number of frames arranged shown by the layout data 101 are determined as ordinary frames (step SA11).

Figure 5A:
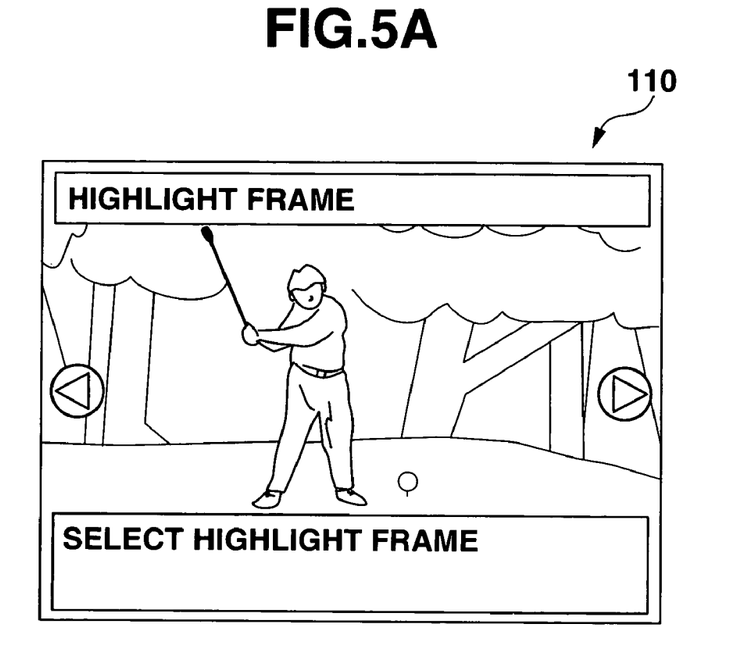
FIG. 5A is a view showing a selection screen of a highlight frame.
Figure 5B:
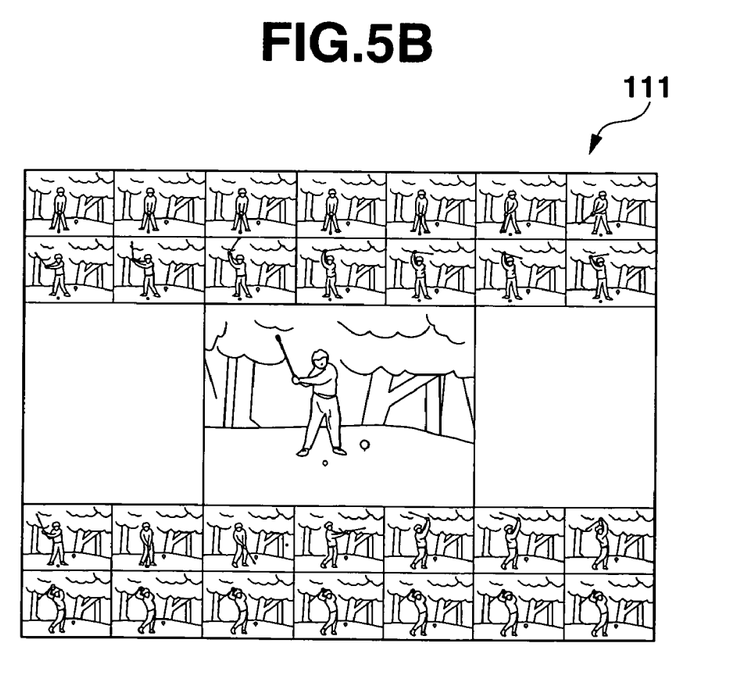
FIG. 5B is a view showing a still image including a selected highlight frame.

A still image in which the determined highlight frame and the ordinary frames are arranged based on the layout data 101 is generated (step SA14), and the generated still image (still image file) is recorded into the recording medium 20 (step SA15). FIG. 5B shows a still image 111 that is generated and recorded in the case where the frame image shown in FIG. 5A is selected as the highlight frame.

Figure 6:
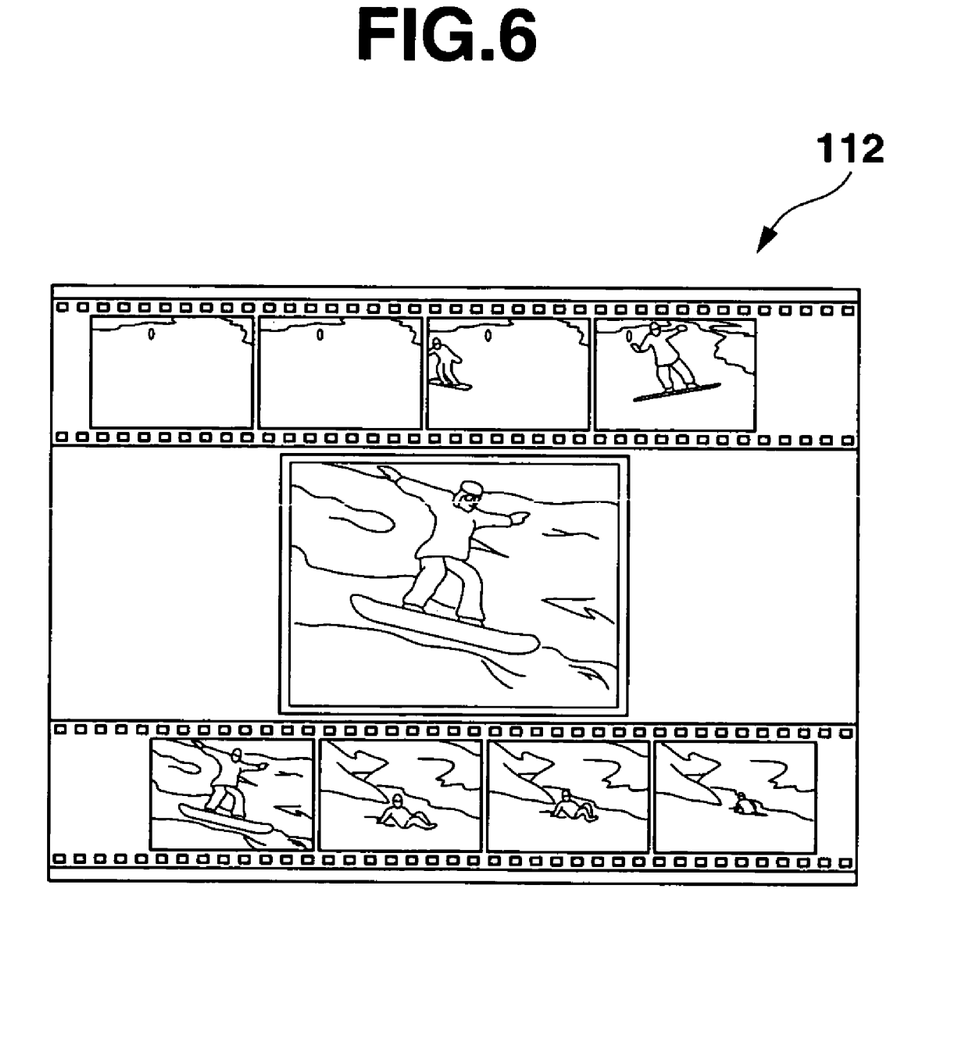
FIG. 6 is a view showing an example of another still image created by the still image generating process.

If the determination result in step SA7 is YES, and there is highlight frame in the automatically selected design, and the selection criterion for the aforementioned highlight frame is "auto" (YES in step SA9), determination is made on the frame wherein the change degree of the clips is largest in the selected moving image, namely, the frame that corresponds to the predetermined judgment criterion, and the image of the frame is determined as the image of the highlight frame (step SA12). Plural frame images at time positions evenly divided by the number of the frame images arranged in the automatically selected design are determined as ordinary frame images (step SA13). A still image in which the determined highlight frame and the ordinary frames are arranged based on the layout data 101 is generated (step SA14), and the generated still image (still image file) is recorded into the recording medium 20 (step SA15). FIG. 6 shows another still image 112 that is generated and recorded based on layout data 101 different from the data shown in FIG. 5B.

As explained above, in the present embodiment, when a still image is generated from a moving image, the layout format (number of frames arranged and layout positions) of frame images in a still image to be generated, namely, a design of a still image to be generated is set in accordance with the number of portions wherein the change of clips in a moving image is the predetermined criterion or more. As a result, the entire characteristics of a moving image are reflected on the layout format of frame images. Accordingly, it is possible to generate and record a more appropriate still image that shows the entire characteristics of a moving image.

Meanwhile, the criterion in automatically selecting the layout format of frame images is not limited to the above-described change degree of clips among frames in a moving image, but instead thereof, other moving image information such as a time length of a moving image to be made into a still image may be used.

In addition, in the embodiment, the judgment criterion in, when there is a highlight frame in an automatically selected design, automatically determining an image of the highlight frame is the image of the frame having the largest change in clips, but instead thereof, the judgment criterion may be made as following. For example, an image of a frame whose contrast is most clear with rich colors, an image of a frame whose audio level is highest, or an image of a frame at a time position designated in advance by the user may be used as the judgment criterion. In these cases as well, it is possible to reflect the entire characteristics of a moving image onto the layout format of frame images.

Figure 7:
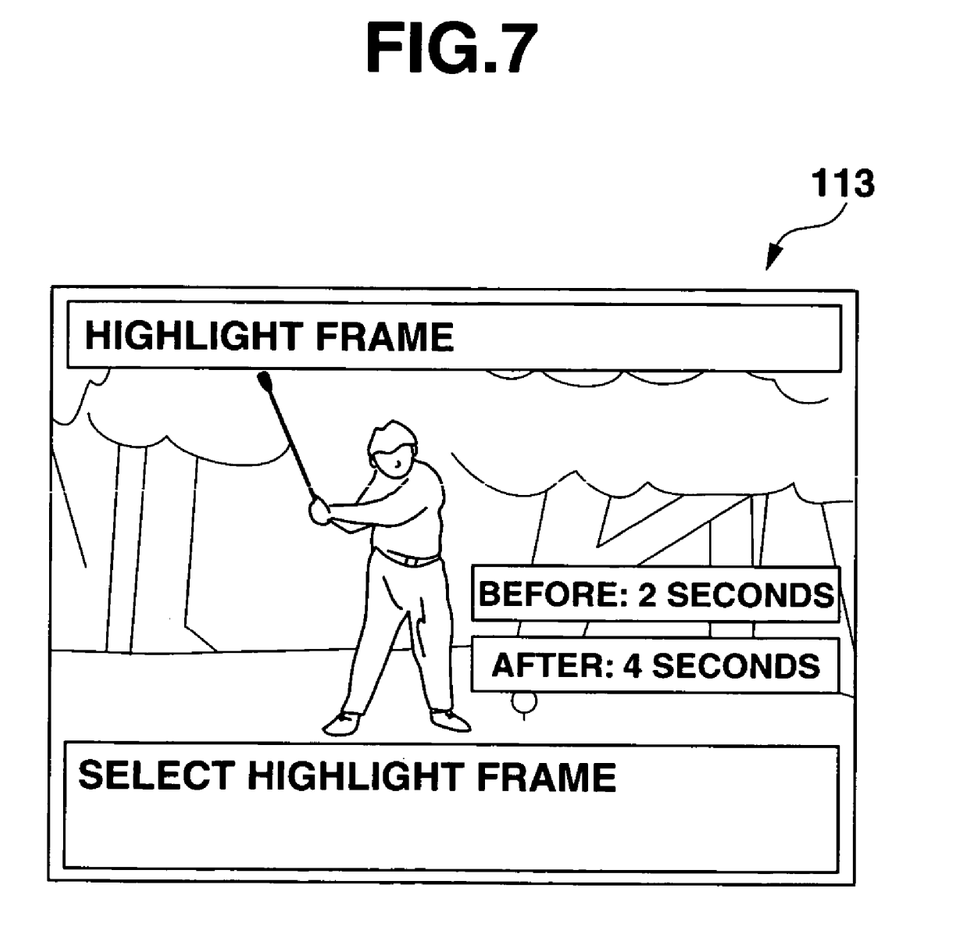
FIG. 7 is a view showing an example of a time setting screen that is displayed when time values before and after a highlight frame is designated.

Further, in the embodiment, when there are highlight frames in the automatically selected design, and the user is prompted to select a highlight frame, images of ordinary frames are the frame images for several frames before and after the designated highlight frame. However, instead thereof, the range to be used as ordinary frames may be designated by the user. In this case, for example, at the time point when a highlight frame is selected in the above step SA10, the aforementioned selection screen 110 (FIG. 5A) may be changed into the time setting screen 113 as shown in FIG. 7, and the user may designate the time (or the number of frames) before and after the highlight frame through the predetermined key operations.

Furthermore, in the case where a moving image to be made into a still image is compressed and coded in the MPEG format, images of ordinary frames may be selected from I pictures (Intra Pictures: intra-frame coded images) serving as independent frame images not depending upon other frame images. In this case, it is possible to reduce the burden necessary for a process of recovering images to be used as ordinary frames.

Moreover, when there are highlight frames in the automatically selected design, images of ordinary frames are set by different methods between the case where the highlight frame is automatically set, and the case where a highlight frame is designated by the user. However instead thereof, images of ordinary frames may be set by the same method in both of the cases. In addition, the above methods of setting images of ordinary, frames may be inverted between the case where a highlight frame is automatically set, and the case where a highlight frame is designated by the user.

Second Embodiment

Figure 8:
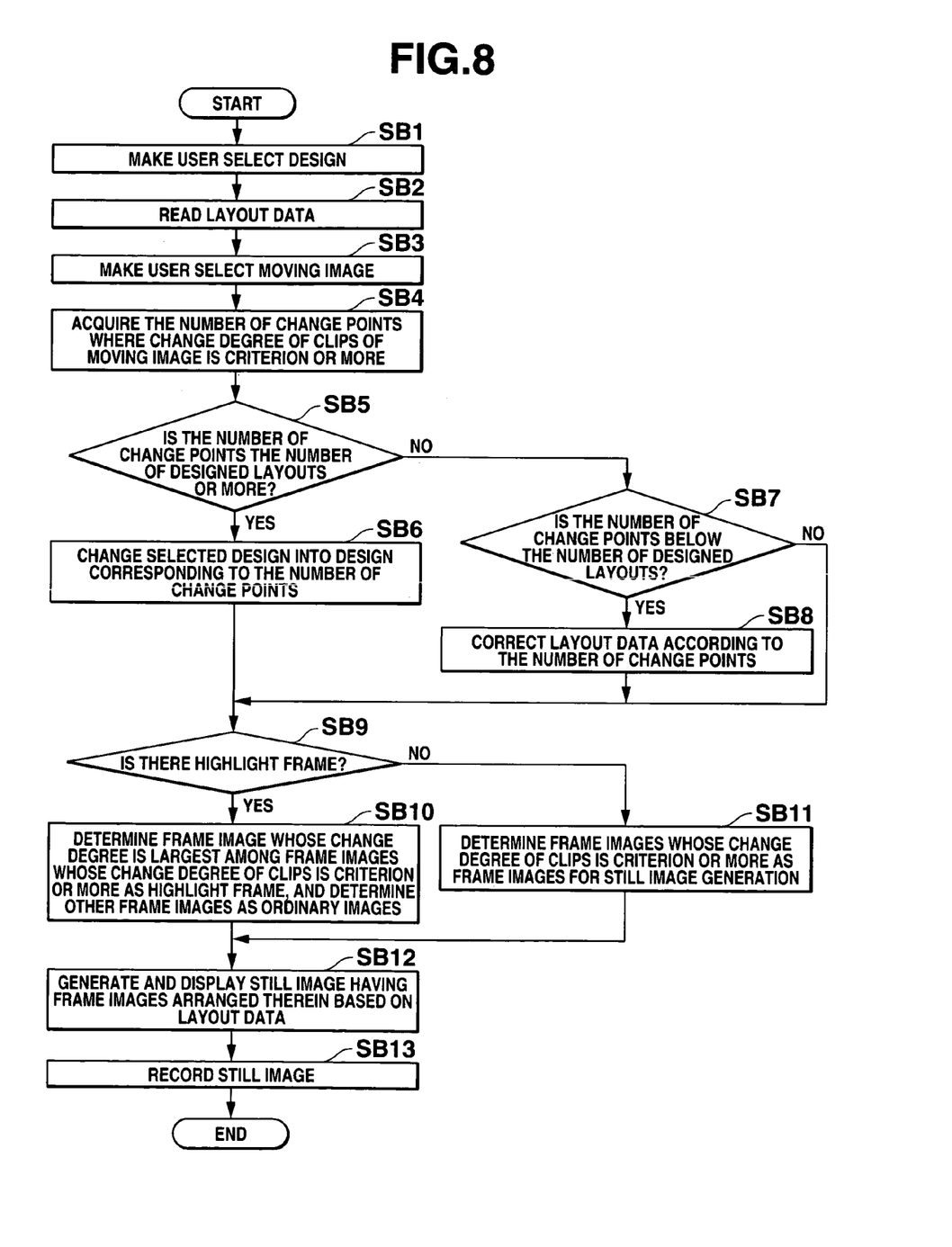
FIG. 8 is a flow chart showing the contents of a still image generating process in a second embodiment.

A second embodiment of the digital camera according to the present invention will be described. The same portions as those of the first embodiment will be indicated in the same reference numerals and their detailed description will be omitted. In the second embodiment, in the digital camera having the above-described configuration, the CPU 13 has functions of acquiring means, extracting means, control means, changing means, and layout adjusting means, whereby, when the still image generation movie mode is selected, the following still image generating process shown in FIG. 8 is performed.

Figure 9:
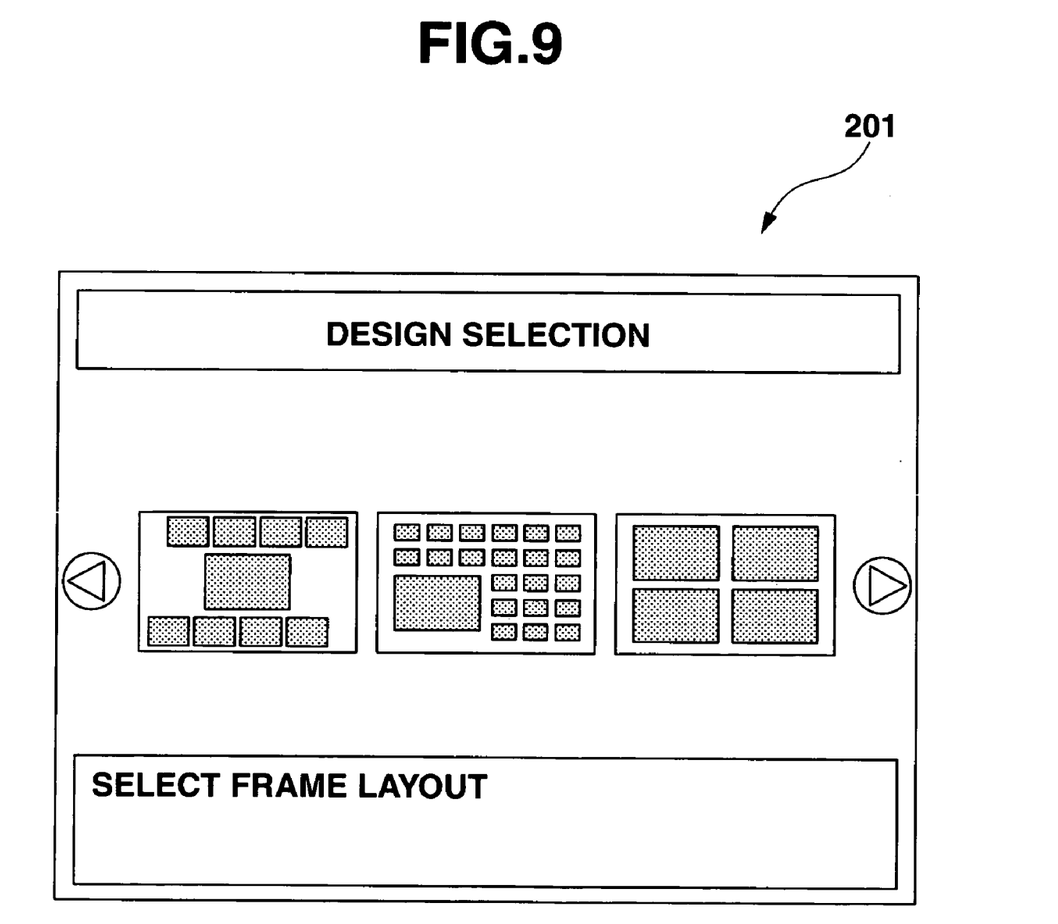
FIG. 9 is a view showing a design selection screen.

More specifically, when the still image generating process is started, the CPU 13 allows the user to select a desired design from plural designs prepared in advance as designs of a still image (step SB1). At this moment, the CPU 13 causes the LCD 12 to display a message to prompt the user to select a design, and a design selection screen 210 comprising design samples showing layout formats shown by plural layout data 101 stored in the program memory 19, as shown in FIG. 9, and allows the user to select a desired design by predetermined key operations (step SB1). Then, the layout data 101 corresponding to the selected design is read out from the program memory 19 (step SB2).

For example, the CPU 13 causes the LCD 12 to display a list of thumbnails of head frames of a moving image stored in the recording medium 20, and allows the user to select a desired moving image by the predetermined key operations (step SB3). Then, the CPU 13 acquires the number of change points in clips of the selected moving image, for example, the number of portions where the change of clips is the predetermined criterion or more, like a portion where a time period in which audio is interrupted is over a predetermined time period, or a portion where the change degree of color tone is a predetermined degree or more (step SB4).

When the number of the acquired change points is larger than the number of frame images arranged in the design selected in step SB1 (YES in step SB5), the selected design is automatically changed into a design whose number of frame images arranged is over the above number of change points, and closest thereto (step SB6). On the contrary, when the number of the acquired change points is smaller than the number of frame images arranged in the design selected in step SB1 (NO in step SB5, YES in step SB7), the number of frame images arranged in the design shown by the layout data 101 read out in step SB2 is changed into the number of change points, and data correction (adjustment) for expanding the layout interval according thereto is performed (step SB8).

Figure 10A:
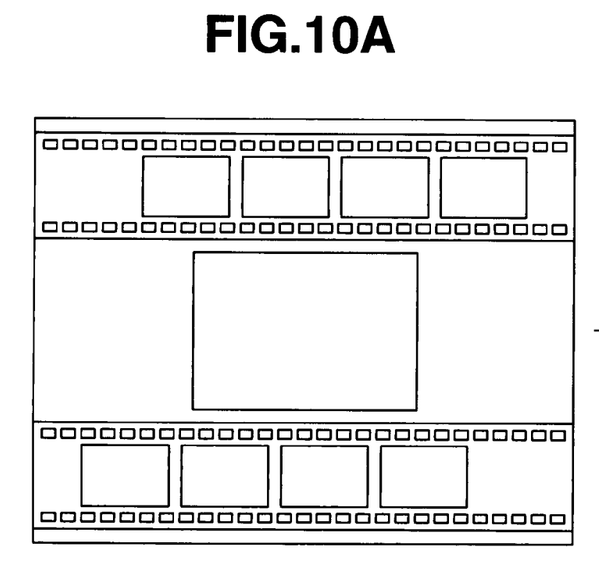
FIGS. 10A and 10B are views showing a change example of a layout format (design) of a frame image.
Figure 10B:
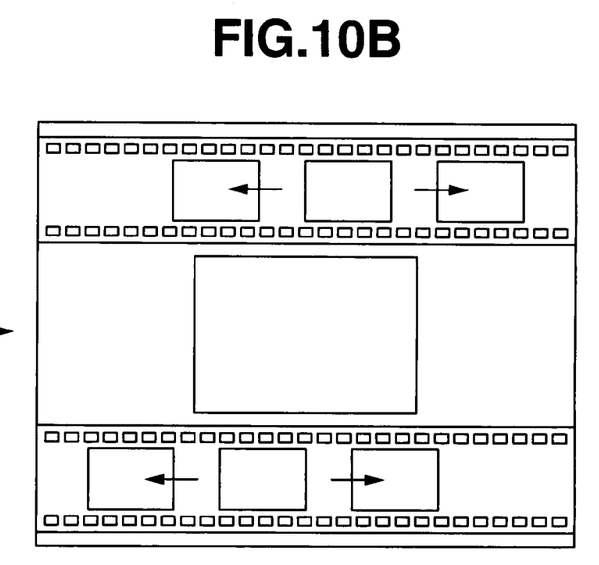

FIGS. 10A and 10B are views showing an example of changing the layout interval, wherein FIG. 10A shows a design before the change, and FIG. 10B shows a design after the change.

It is determined whether or not the layout data 101 read out in step SB2, the layout data 101 changed in step SB5, or the layout data 101 corrected in step SB8 includes information of a highlight frame. If the information of the highlight frame is included (YES in step SB9), frame images at the portions where the change degree in the change points in clips of the selected moving image is the predetermined criterion or more, for example, at a portion where a time period in which audio is interrupted is a predetermined time period or more, or a portion where the change degree of color tone is a predetermined degree or more, are extracted. Then, a frame image whose change degree is largest among the frame images is determined as a highlight frame, and other frame images are determined as ordinary images (step SB10). A still image in which the determined highlight frame and the ordinary frames are arranged based on the layout data 101 is generated (step SB12), and the generated still image (still image file) is recorded into the recording medium 20 (step SB13).

If the information of the highlight frame is not included (NO in step SB9), plural frame images at the portions where the change degree in the change points in clips of the selected moving image is the predetermined criterion or more are extracted, and they are determined as frame images for still image generation (step SB11). A still image in which the plural frame images are arranged based on the layout data 101 (step SB12), and the generated still image (still image file) is recorded into the recording medium 20 (step SB13).

As explained above, in the embodiment, when a still image is generated from a moving image, the frame images whose change degree in the change points in clips of the selected moving image is the predetermined criterion or more are automatically extracted (selected) as the frame images that are arranged in a still image frame to be generated. Therefore, it is possible to make the plural frame images that are arranged in the still image ones showing the entire characteristics of a moving image. Accordingly, it is possible to generate and record a more appropriate still image that shows the entire characteristics of a moving image.

In the embodiment, the frame images that are arranged in a still image to be generated are extracted from the selected moving image based on the change degree in the change points in clips. However instead thereof, the frame images that are arranged in a still image to be generated may be extracted based on other moving image information such as, for example, the clearness of contrast, the richness of hue, and the height of audio level. In such cases as well, it is possible to make the plural frame images that are arranged in the still image ones showing the entire characteristics of a moving image.

For example, when a moving image to be made into a still image is compressed and coded in the MPEG format, the frame images that are arranged in a still image to be generated may be extracted from I pictures. In this case, it is possible to reduce the burden necessary for a process of recovering frame images necessary in extracting frame images.

The first and second embodiments explain a digital camera having a function of generating a still image from a moving image stored in video recording, and displaying and recording (outputting) the generated still image. However, the present invention is not limited thereto, but may be applied to the following devices. Specifically, the present invention may be applied to a printer that prints a still image based on moving image data supplied via a recording medium such as, for example, various kinds of memory cards, or supplied via communication from a digital camera or the like, and a cellular phone with a built-in camera having a moving image recording function. Moreover, the present invention may be realized by a general personal computer by use of a program for performing the above-described still image generation process.

What is claimed is:

1. An image processor comprising:
a memory which stores a moving image;
a layout information storage which stores plural items of layout information showing plural layout formats of plural frame images included in the moving image;
an acquiring unit which acquires moving image information peculiar to the moving image from the moving image stored in the memory;
a selector which selects one of the layout information stored in the layout information storage based on the moving image information acquired by the acquiring unit; and
a still image generating unit which generates a still image in which frame images included in the moving image stored in the memory are arranged in a layout format shown by the layout information selected by the selector.

2. The image processor according to claim 1, wherein the moving image information peculiar to the moving image comprises a time length of the moving image.

3. The image processor according to claim 1, wherein moving image information peculiar to the moving image comprises the number of change points whose change degree of contents between two adjacent frame images in frame images included in the moving image is a threshold or more.

4. The image processor according to claim 1, wherein the still image generating unit comprises a controller which, when the layout format shown by the layout information selected by the selector comprises a layout format including a representative frame image whose size is larger than that of other frame images, makes a user select a frame image to be used as the representative frame image.

5. The image processor according to claim 4, wherein the still image generating unit generates a still image including the representative frame image, and plural frame images of frames for a predetermined time period before and after the representative frame image.

6. The image processor according to claim 5, wherein the controller allows the user to select a predetermined time period before and after the representative frame image.

7. The image processor according to claim 1, wherein the still image generating unit comprises controller which, when the layout format shown by the layout information selected by the selector comprises a layout format including a representative frame image whose size is larger than that of other frame images, determines a frame image to be used as the representative frame image based on a predetermined judgment criterion from all frames of the moving image.

8. The image processor according to claim 7, wherein the still image generating unit generates a still image including the representative frame image, and plural frame images of frames for a predetermined time period before and after the representative frame image.

9. The image processor according to claim 8, wherein the controller allows the user to select a predetermined time period before and after the representative frame image.

* * * * *